United States Patent
Voge et al.

(10) Patent No.: US 9,415,639 B2
(45) Date of Patent: Aug. 16, 2016

(54) TYRE COMPRISING A SELF-SEALING LAYER HAVING A RADIAL CREEP GRADIENT

(75) Inventors: Bozena Voge, Clermont-Ferrand (FR); José Merino Lopez, Clermont-Ferrand (FR); Michel Ahouanto, Clermont-Ferrand (FR)

(73) Assignees: Compagnie Generale Des Etablissements Michelin, Clermont-Ferrand (FR); Michelin Recherche Et Technique S.A., Granges-Paccot (CH)

( * ) Notice: Subject to any disclaimer, the term of this patent is extended or adjusted under 35 U.S.C. 154(b) by 229 days.

(21) Appl. No.: 13/879,295

(22) PCT Filed: Oct. 13, 2011

(86) PCT No.: PCT/FR2011/052390
§ 371 (c)(1),
(2), (4) Date: Jun. 24, 2013

(87) PCT Pub. No.: WO2012/052663
PCT Pub. Date: Apr. 26, 2012

(65) Prior Publication Data
US 2013/0263990 A1    Oct. 10, 2013

(30) Foreign Application Priority Data

Oct. 18, 2010  (FR) ..................................... 10 58488

(51) Int. Cl.
*B60C 5/14*    (2006.01)
*B60C 19/00*   (2006.01)
(Continued)

(52) U.S. Cl.
CPC ................. *B60C 19/12* (2013.01); *B29C 73/22* (2013.01); *B60C 19/122* (2013.04); *C08K 5/0016* (2013.01); *C08K 5/01* (2013.01); *Y10T 152/10666* (2015.01)

(58) Field of Classification Search
CPC .... B60C 19/12; B60C 19/122; B60C 19/125; B60C 19/127; B60C 5/14; B60C 5/142
See application file for complete search history.

(56) References Cited

U.S. PATENT DOCUMENTS 4,044,811 A * 8/1977 Dudek et al. .................. 152/452
4,064,922 A * 12/1977 Farber et al. .................. 152/504
(Continued)

FOREIGN PATENT DOCUMENTS

DE    102008003554    *    7/2009
EP    1 034 916 A1      9/2000
(Continued)

OTHER PUBLICATIONS

Machine translation of DE 102008003554, 2009.*
(Continued)

*Primary Examiner* — Justin Fischer
(74) *Attorney, Agent, or Firm* — Fitzpatrick, Cella, Harper & Scinto

(57) ABSTRACT

A pneumatic tire includes an internal sealing layer, which partially delimits an internal volume of the pneumatic tire, and a self-sealing layer formed of a self-sealing product. The self-sealing layer is positioned radially on an inside region with respect to the internal sealing layer, and has a creep resistance indicator that decreases radially outwards, i.e., towards outside of the pneumatic tire.

36 Claims, 2 Drawing Sheets

(51) Int. Cl.
  *B60C 19/12*  (2006.01)
  *B29C 73/22*  (2006.01)
  *C08K 5/00*   (2006.01)
  *C08K 5/01*   (2006.01)

(56) References Cited

U.S. PATENT DOCUMENTS

| | | | | |
|---|---|---|---|---|
| 4,409,056 A | * | 10/1983 | Takamatsu et al. | 156/334 |
| 4,761,136 A | | 8/1988 | Madhavan et al. | 433/214 |
| 5,295,525 A | * | 3/1994 | Sanda, Jr. | B29C 73/163 106/33 |
| 2010/0071821 A1 | * | 3/2010 | Sekiguchi | B29C 73/20 152/504 |
| 2010/0300593 A1 | | 12/2010 | Lopez et al. | 152/504 |
| 2010/0317758 A1 | | 12/2010 | Okuda et al. | 521/140 |
| 2011/0061782 A1 | | 3/2011 | Lopez et al. | 152/503 |
| 2011/0174421 A1 | | 7/2011 | Voge et al. | 152/502 |
| 2011/0198010 A1 | | 8/2011 | Voge et al. | 152/502 |
| 2011/0213050 A1 | | 9/2011 | Pialot et al. | 523/166 |
| 2012/0118463 A1 | | 5/2012 | Lesage et al. | 152/502 |
| 2012/0160339 A1 | | 6/2012 | Lopez et al. | 137/223 |
| 2012/0199260 A1 | | 8/2012 | Lopez et al. | 152/504 |
| 2012/0234449 A1 | | 9/2012 | Greiveldinger et al. | 152/502 |
| 2012/0273109 A1 | | 11/2012 | Lopez et al. | 152/502 |

FOREIGN PATENT DOCUMENTS

| | | |
|---|---|---|
| FR | 2 939 145 A1 | 6/2010 |
| GB | 340681 | 1/1931 |
| GB | 755672 | 8/1956 |
| JP | 53-97046 | 8/1978 |
| JP | 11-35923 A | 2/1999 |
| JP | 2001-18609 * | 1/2001 |
| JP | 2011-528631 A | 11/2011 |
| WO | WO 03/101709 A1 | 12/2003 |
| WO | WO 2010/012412 A2 | 2/2010 |
| WO | WO 2010/012413 A1 | 2/2010 |

OTHER PUBLICATIONS

Machine translation of JP 2001-18609, 2001.*
Japanese Office Action issued in related Japanese Application No. 2013-534363 on Oct. 19, 2015 with English language translation (7 pages).

* cited by examiner

TYRE COMPRISING A SELF-SEALING LAYER HAVING A RADIAL CREEP GRADIENT

FIELD OF THE INVENTION

The invention relates to the field of pneumatic tyres and, more particularly, to the field of pneumatic tyres equipped with means for self-sealing a puncture in the pneumatic tyre.

BACKGROUND

In general, a pneumatic tyre comprises an internal sealing layer delimiting the internal volume of the pneumatic tyre. This layer generally comprises a rubber of the butyl type which is known for its airtightness.

In use, the pneumatic tyre may become punctured if a perforating object, for example a nail, perforates the pneumatic tyre. Such perforation causes the pneumatic tyre to lose air.

In order to prevent the pneumatic tyre from losing air, it has been proposed that an additional layer of a relatively soft product capable of creeping readily be positioned in contact with the internal sealing layer. Thus, in the event of a puncture, the product of the additional layer, because of its softness and its ability to creep readily, penetrates the puncture and prevents the pneumatic tyre from losing air. Such a product with relative softness and the ability to creep readily is said to be self-sealing.

However, developing a self-sealing product is a relatively complex process. Specifically, if the product is too soft and/or has too great an ability to creep, the self-sealing product may creep under the effect of centrifugal force when the pneumatic tyre is being used. Thus, the product creeps axially towards the centre of the pneumatic tyre. The axially external parts, or shoulders, of the pneumatic tyre are then not as well protected. Furthermore, the product may creep axially towards the centre of the pneumatic tyre even when the pneumatic tyre is stationary, particularly under conditions of high temperature. In addition, if the puncturing object is removed from the pneumatic tyre, the self-sealing product may creep out through the puncture and escape from the pneumatic tyre. The function of preventing air loss is then no longer assured. Finally, the self-sealing product may interact chemically with intermediate storage inserts. When the layer of product is assembled onto the green form of the pneumatic tyre on a tyre-building drum, the self-sealing product may also interact with the tyre-building drum. In particular, it may also interact by sticking to the curing membrane of the vulcanizing press, soiling it and leading to the need to shut down the vulcanizing plant.

Furthermore, if the product is too rigid and/or does not have a great enough ability to creep, the product does not creep into the puncture sufficiently, particularly in cold weather.

BRIEF DESCRIPTION OF THE INVENTION

It is therefore an object of the invention to provide a layer of self-sealing product that is effective and compatible with the method of manufacture of the pneumatic tyre.

To that end, one subject of the invention is a pneumatic tyre comprising an internal sealing layer partially delimiting the internal volume of the pneumatic tyre, the pneumatic tyre comprising a layer of at least one self-sealing product, known as the self-sealing layer, positioned radially on the inside with respect to the internal sealing layer, the self-sealing layer having a creep resistance indicator that decreases radially towards the outside of the pneumatic tyre.

The layer of self-sealing product does not interact with the various tools used in the manufacturing process. Specifically, because of the radial decrease in the indicator, the part in contact with the tools is the part that creeps the least and which presents the least risk of interacting with the tools, particularly by sticking. Specifically, in addition to not creeping as much as the part that is not in contact with the tools, the part that is in contact with the tools has a lower level of tack than the part that is not in contact with the tools.

Furthermore, the layer effectively performs the self-sealing function. Specifically, the part that creeps the most contains the product that is first to enter the puncture. Thus, this part correctly performs the self-sealing function. In addition, the axially external parts or shoulders of the pneumatic tyre are protected by the part that does not creep as much but which does however adequately prevent a loss of air.

The radial decrease in an indicator corresponds to a reduction in the indicator in a direction radially through the layer of self-sealing product from the inside of the pneumatic tyre towards the outside of the pneumatic tyre, i.e., in a direction away from the axis of rotation of the pneumatic tyre. Thus, a decrease may be continuous, i.e., the indicator decreases constantly in a direction radially through the layer of self-sealing product. A decrease may also be discontinuous, which means that the indicator decreases in stages when progressing radially through the layer of self-sealing product.

The creep resistance indicator is indicative of the ability of the product to withstand deformation under the effect of a stress over a certain period of time. The lower the indicator, the more the product can creep; the higher the indicator, the less the product can creep.

In the present description, unless expressly indicated otherwise, all percentages (%) are mass %. Further, any range of values denoted by the expression "between a and b" represents the range of values extending from more than a to less than b (i.e., a and b end points excluded), whereas any range of values denoted by the expression "from a to b" means the range of values from end point "a" to end point "b", i.e., including the strict end points "a" and "b".

In the elastomeric compositions of the present description, the abbreviation "phr" means part by weight per hundred parts of solid elastomer.

Advantageously, each self-sealing product is an elastomeric composition containing at least, by way of predominant elastomer (preferably representing over 50 phr), one diene elastomer, a hydrocarbon resin, a liquid plasticizer the glass transition temperature of which is below −10° C., preferably −20° C., or even −30° C., and possibly a filler.

For preference, the self-sealing product comprises:
between 20 and 90 phr of the hydrocarbon resin;
at most 60 phr of the liquid plasticizer;
at most 60 phr of fillers.

For preference, the liquid plasticizer content in the self-sealing layer is at a maximum in a radially outer portion of the self-sealing layer and at a minimum in a radially inner portion of the self-sealing layer, at least over an axial portion of the self-sealing layer that is centred axially about the median plane of the pneumatic tyre. In other words, the self-sealing layer has a liquid plasticizer content that increases radially towards the outside of the pneumatic tyre at least over an axial portion of the self-sealing layer that is centred axially about the median plane of the pneumatic tyre.

The difference in content is preferably greater than 5 phr.

For preference, the fillers content in the self-sealing layer is at a minimum in a radially outer portion of the self-sealing layer and at a maximum in a radially inner portion of the self-sealing layer, at least over an axial portion of the self-sealing layer that is centred axially about the median plane of the pneumatic tyre. In other words, the self-sealing layer has a fillers content that decreases radially towards the outside of the pneumatic tyre at least over an axial portion of the self-sealing layer that is centred axially about the median plane of the pneumatic tyre.

According to another, alternative or complementary, embodiment, each self-sealing product further comprises a cross linking system and the cross linking-system content in the self-sealing layer is at a minimum in a radially outer portion of the self-sealing layer and at a maximum in the radially inner portion of the self-sealing layer, at least over an axial portion of the self-sealing layer that is centred axially about the median plane of the pneumatic tyre. In other words, the self-sealing layer has a cross linking system content that decreases radially towards the outside of the pneumatic tyre at least over an axial portion of the self-sealing layer that is centred axially about the median plane of the pneumatic tyre.

In one embodiment, the self-sealing layer comprises first and second layers respectively of first and second distinct self-sealing products.

According to other features of the pneumatic tyre according to the invention, the first layer is positioned radially on the inside with respect to the second layer and the first self-sealing product has a creep resistance indicator greater than a creep resistance indicator of the second self-sealing product. Thus, the first layer at least partially delimits the internal volume of the pneumatic tyre.

Advantageously, the first layer extends axially on the outside beyond the second layer, i.e., the first layer completely covers the second layer. The second layer is therefore not visible and not in contact with the air. Because the product of the first layer has a higher creep resistance indicator than the product of the second layer, the product of the second layer cannot creep towards the centre of the pneumatic tyre because it is trapped in a relatively rigid envelope formed by the first layer and the inner liner sealing layer.

Advantageously, each of the first and second self-sealing products contains, by way of predominant elastomer, a diene elastomer, a hydrocarbon resin, a liquid plasticizer the glass transition temperature of which is below −10° C., preferably −20° C., or even −30° C., and possibly a filler.

For preference, the first self-sealing product comprises:
between 20 and 70 phr of the hydrocarbon resin;
at most 20 phr of the liquid plasticizer, preferably at most 2 phr of the liquid plasticizer;
at most 60 phr of fillers.

For preference, the second self-sealing product comprises:
between 30 and 90 phr of the hydrocarbon resin;
at most 60 phr of the liquid plasticizer;
at most 30 phr of fillers.

The first layer directly covers the second layer. In other words, the first layer is in contact with the second layer. As an alternative, one or more intermediate layers are interposed between the first and the second layer.

The first layer comprises two axial end edges in contact with the internal sealing layer. The second layer comprises two axial end edges in contact with the internal sealing layer. The risk of detachment of the first and second layers is thus avoided.

The second layer directly covers the internal sealing layer. In other words, the second layer is in contact with the internal sealing layer. As an alternative, one or more intermediate layers are interposed between the second layer and the internal sealing layer.

In one embodiment, the thickness of the first layer is axially variable. For preference, the thickness of an axial end portion of the first layer is greater than the thickness of an axially central portion of the first layer. Thus, even if the product of the second layer creeps slightly, the axially external parts or shoulders of the pneumatic tyre are protected against air loss by a sufficient thickness of the first layer.

In another embodiment, the thickness of the second layer is axially variable. For preference, the thickness of an axial end portion of the second layer is less than the thickness of an axially central portion of the second layer. Because the product of the second layer has a relatively lower creep resistance, this will limit the extent to which it creeps axially towards the centre of the pneumatic tyre.

In one embodiment, in the central part of the pneumatic tyre, the thickness of the first layer is less than the thickness of the second layer. Because the second layer is more effective at preventing air loss than the first layer, the self-sealing performance of the pneumatic tyre is thus optimized. For preference, the thickness of the second layer is greater than twice the thickness of the first layer over at least 50% of the axial dimension of the second layer.

The creep resistance indicator may be a Mooney viscosity measurement effected at 60° C. using an L-type rotor.

For preference, the amplitude by which the creep resistance indicator in the self-sealing layer varies is between 3 and 25 Mooney units (UM) and highly preferably, between 5 and 20 Mooney units (UM).

Below 3 UM, the increase in creep resistance of the self-sealing layer positioned in the shoulders is not enough to guarantee sufficient resistance to creep and beyond 25 UM, it is the air loss prevention function that is no longer assured.

According to other optional features of the pneumatic tyre according to the invention:
The fillers content of the first self-sealing product is greater than or equal to the fillers content of the second sealing product;
The liquid plasticizer content of the first self-sealing product is less than the liquid plasticizer content of the second self-sealing product;
The products further comprise a system for cross linking the diene elastomer, and the cross linking system content of the first self-sealing product is greater than or equal to the cross linking system content of the second self-sealing product.

The characteristics relating to the contents of fillers, liquid plasticizer and cross linking system in the first and second self-sealing products allow, individually or synergistically, that the first self-sealing product is rendered more resistant to creep, i.e., less able to creep than the second self-sealing product but it also allows the level of tack of the first self-sealing product to be reduced in relating to the level of tack of the second self-sealing product.

The diene elastomer is of saturated or unsaturated type. What is meant by an unsaturated diene elastomer is a diene elastomer derived at least in part from conjugated diene monomers having a content of units derived from conjugated dienes which is higher than 30% (mol %), preferably 50%. Such a diene elastomer is preferably selected from the group consisting of polybutadiene (BR), natural rubber (NR) synthetic polyisoprenes (IR), butadiene copolymers, isoprene copolymers and mixtures of such elastomers. The unsaturated diene elastomer is more advantageously an isoprene elastomer, preferably selected from the group consisting of natural rubber, synthetic polyisoprenes and mixtures of such elastomers.

The term "resin" is reserved in this application, by the definition known to those skilled in the art, for a compound which is solid at room temperatures (23° C.), as opposed to a liquid plasticizing compound such as an oil.

The hydrocarbon resin is selected from the group consisting of homopolymer or copolymer cyclopentadiene (CPD) or dicyclopentadiene (DCPD) resins, homopolymer or copolymer terpene resins, homopolymer or copolymer cut C5 resins, and mixtures of such resins. Of the copolymer resins stated hereinabove, the hydrocarbon resin is advantageously selected from the group consisting of CPD/vinylaromatic copolymer resins, DCPD/vinylaromatic copolymer resins, CPD/terpene copolymer resins, DCPD/terpene copolymer resins, CPD/C5 cut copolymer resins, DCPD/C5 cut copolymer resins, terpene/vinylaromatic copolymer resins, C5 cut/vinylaromatic copolymer resins and mixtures of these resins.

The liquid (at 23° C.) plasticizing agent said to be of low Tg (glass transition temperature) has the role of softening the self-sealing product by diluting the diene elastomer and the hydrocarbon resin, in particularly improving the cold self-sealing performance.

The plasticizing agent is selected from the group consisting of liquid elastomers, polyolefin oils, naphthene oils, paraffin oils, DAE (Distillate Aromatic Extracts) oils, MES (Medium Extracted Extracts) oils, TDAE (Treated Distillate Aromatic Extracts) oils, mineral oils, vegetable oils, ether plasticizers, phosphate plasticizers, sulfonate plasticizers and mixtures of these compounds. For preference, the liquid plasticizer is selected from the group consisting of liquid elastomers, polyolefin oils, vegetable oils and mixtures of these compounds. Highly preferably, the liquid plasticizer is selected from the group consisting of liquid polybutadienes, liquid polyisoprenes, vegetable oils and mixtures of these compounds.

The fillers are of the reinforcing, non-reinforcing or inert type and have the role of providing the self-sealing product with a minimal mechanical integrity. The fillers are, for example, nanoparticles of carbon black or reinforcing inorganic fillers or a mixture of these two types of filler. The non-reinforcing fillers may be micro particles of natural calcium carbonates (chalk) or synthetic calcium carbonates, synthetic or natural silicates (such as kaolin, talc, mica), ground silicas, titanium oxides, aluminas or even aluminosilicates.

Various additives may also be added, preferably in a quantity less than 20 phr, more preferably than 15 phr. The additives contain protective agents such as anti-UV, antioxidants or antiozone agents, various other stabilizers, colorants which may advantageously be used for colouring each self-sealing product.

Each self-sealing product may also optionally comprise a system for cross linking the diene elastomer. This system is of the vulcanizing type, in this instance based on sulphur.

Another subject of the invention is a method of manufacturing a green pneumatic tyre, in which:
 one layer of at least one self-sealing product, known as the self-sealing layer, is applied to a surface of a tyre-building drum, the self-sealing layer having a creep resistance indicator that increases radially towards the outside of the green tyre,
 an internal sealing layer is applied in contact with the self-sealing layer.

In one embodiment:
 a first layer of a first self-sealing product is applied to the surface of the tyre-building drum,
 a second layer of a second self-sealing product distinct from the first self-sealing product, is applied to the first layer, and
 the internal sealing layer is applied in contact with the second layer.

BRIEF DESCRIPTION OF THE DRAWINGS

The invention will be better understood upon reading the description which will follow, which is given solely by way of nonlimiting example and with reference to the drawings in which.

Mutually orthogonal axes X, Y, Z corresponding to the habitual radial (X), axial (Y) and circumferential (Z) orientations of the pneumatic tyre have been indicated in the figures.

DETAILED DESCRIPTION OF THE INVENTION

Figure 1:
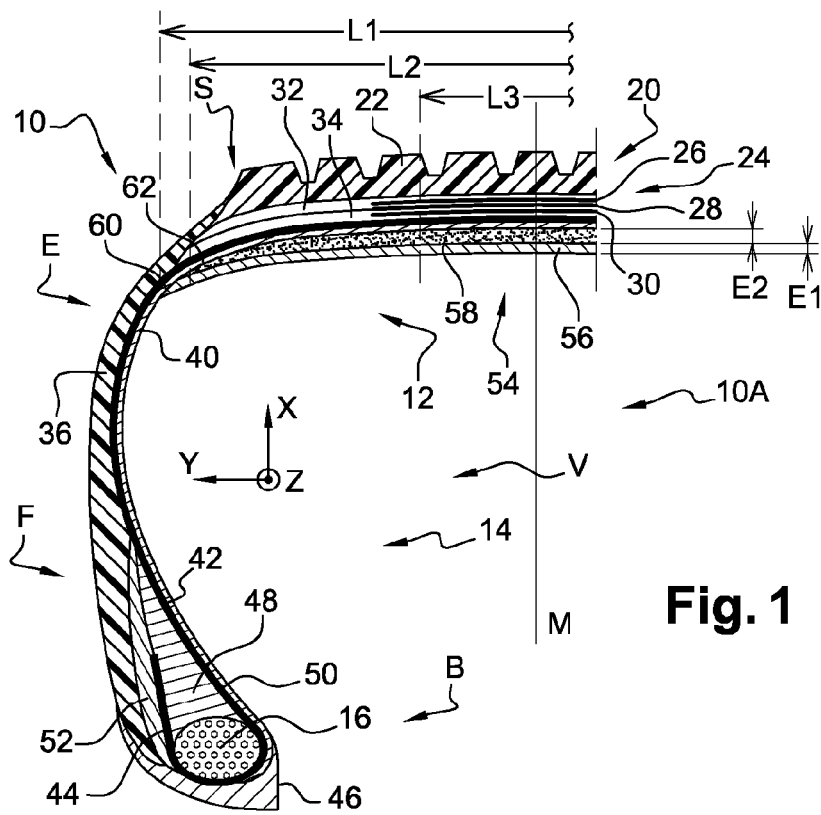
FIG. 1 illustrates a view in radial section of a pneumatic tyre according to a first embodiment of the invention.

FIG. 1 depicts a pneumatic tyre according to a first embodiment of the invention, denoted by the overall reference 10A.

In this particular instance, the pneumatic tyre 10A is intended to be fitted to a wheel of a motor vehicle of the passenger vehicle type.

In the conventional way, the pneumatic tyre 10A comprises a crown S extended by two shoulders E, two sidewalls F and two beads B. Just one sidewall F, just one shoulder E and just one bead B are depicted in the figures.

Two bead wires 16 (just one is depicted) are embedded in the beads B. The two bead wires 16 are arranged symmetrically with respect to a median radial plane M of the pneumatic tyre.

Each bead wire 16 is of revolution about a reference axis. This reference axis, substantially parallel to the direction Y, more or less coincides with an axis of revolution of the pneumatic tyre.

The crown S comprises a tread 20, equipped with tread patterns 22, and a reinforcement 24. This reinforcement 24 comprises plies of metal or textile reinforcers 26, 28 and 30 embedded in masses of rubber 32 and 34.

A mass of rubber 36 extends radially from the crown as far as the bead wire 16 of the bead B, thereby delimiting an outer surface 38 of the shoulder E, of the sidewall F and of the bead B.

The pneumatic tyre 10A also comprises an inner liner layer of sealing rubber 40, and a carcass ply 42. The layer 40 at least partially delimits the internal volume V of the pneumatic tyre 10A and is made of a rubber of butyl type. The layer 40 and the ply 42 are of toroidal overall shape and are both coaxial with the bead wires 16. The layer 40 and the ply 42 extend between the two annular bead wires 16 of the pneumatic tyre 10A, passing via the crown S.

In the bead B of the pneumatic tyre 10A, the carcass ply 42 comprises a part 44 turned back around the bead wire 16. The bead B also comprises an annular mass of protective rubber 46 intended, in part, to allow the pneumatic tyre 10A to be secured radially and axially to a rim.

The bead B of the pneumatic tyre 10 also comprises a mass of rubber 48 for filling a volume comprised between the turned-back part 44 of the carcass ply 42 and a part 50 of the carcass ply 42 that axially faces the turned-back part 44. The bead B also comprises a mass of rubber 52. This mass 52 forms a filling mass which at least partially covers the turned-back part 44 of the carcass ply 42. The mass 52 is locally separated from the mass 48 by the turned-back part 44.

The pneumatic tyre 10A also comprises a layer 54 of at least one self-sealing product arranged radially internally with respect to the layer of sealing rubber 40. In this particular instance, the layer 54 is applied in contact with the internal sealing layer 40. The layer 54 at least partially delimits the internal volume V of the pneumatic tyre.

The layer 54 comprises a first layer 56 of a first self-sealing product O1. The layer 54 also comprises a second layer 58 of a second self-sealing product O2 distinct from the first product O1. The first layer 56 is positioned radially on the inside with respect to the second layer 58. In this particular instance, the first layer 56 is in contact with the second layer 58.

Each of the first and second self-sealing products O1, O2 comprises, by way of predominant elastomer, a saturated diene elastomer, a hydrocarbon resin, a liquid plasticizer the glass transition temperature of which is below −10° C. and possibly a filler and a cross linking system.

Each self-sealing product O1, O2 comprises between 20 and 90 parts by weight per hundred parts of solid elastomer of the hydrocarbon resin, at most 60 parts by weight per hundred parts of solid elastomer of the liquid plasticizer, and at most 60 parts by weight per hundred parts of solid elastomer of fillers.

The first self-sealing product O1 comprises between 20 and 70 phr of the hydrocarbon resin, at most 20 phr of the liquid plasticizer and at most 60 phr of the fillers. In this particular instance, the first self-sealing product O1 advantageously comprises at most 2 phr of the liquid plasticizer. For preference, the diene elastomer is saturated.

The second self-sealing product O2 comprises between 30 and 90 phr of the hydrocarbon resin, at most 60 phr of the liquid plasticiser and at most 30 phr of the fillers. For preference, the diene elastomer is unsaturated.

The fillers content of the self-sealing layer 54 is at a minimum in the radially outer portion 58 of the self-sealing layer 54 and at a maximum in the radially inner portion 56 of the self-sealing layer 54, at least over an axial portion L3 of the self-sealing layer 54 that is centred axially about the median plane M of the pneumatic tyre 10A. Here, the fillers content of the first self-sealing product O1 is greater than or equal to the fillers content of the second self-sealing product O2 over the axial portion L3, which means that the self-sealing layer 54 has a fillers content that decreases radially towards the outside of the pneumatic tyre, at least over the axial portion L3.

The liquid plasticizer content in the self-sealing layer 54 is at a maximum in the radially outer portion 58 of the self-sealing layer 54 and at a minimum in the radially inner portion 56 of the self-sealing layer 54, at least over the axial portion L3. Here, the liquid plasticizer content of the first self-sealing product O1 is less than the liquid plasticizer content of the second self-sealing product O2 over the axial portion L3, which means that the layer 54 has a liquid plasticizer content that increases radially towards the outside of the pneumatic tyre, at least over the axial portion L3. The radial variation in liquid plasticizer content in the self-sealing layer 54 is greater than 5 parts per hundred parts of solid elastomer.

The cross linking system content of the self-sealing layer 54 is at a minimum in a radially outer portion 58 of the self-sealing layer 54 and at a maximum in a radially inner portion 56 of the self-sealing layer 54, at least over the axial portion L3. Here, the cross linking system content of the first self-sealing product O1 is greater than or equal to the cross linking system content of the second self-sealing product O2 over the axial portion L3, which means that the self-sealing layer 54 has a cross linking system content that decreases radially towards the outside of the pneumatic tyre at least over the axial portion L3.

The first and second layers 56, 58 respectively directly cover the second layer 58 and the internal sealing layer 40. The axial dimension, or width L1 of the first layer 56 is greater than the axial dimension, or width L2, of the second layer 58. In this particular instance, L1>L2+2 cm. Thus, the first layer 56 completely covers the second layer 58. The first layer 56 partially delimits the internal volume of the pneumatic tyre 10A and comprises two axial end edges 60 in contact with the layer 40. The second layer 58 comprises two axial end edges 62 likewise in contact with the layer 40.

In this first embodiment, the thickness E1 of the first layer 56 is less than the thickness E2 of the second layer 58. In this particular instance, E1<2 mm and preferably E1<1 mm. For preference, the thickness E1 of the first layer 56 is less than the thickness E2 over an axially central portion of the pneumatic tyre 10A and, more preferably still, over at least 50% of the axial dimension of the second layer 58. As an alternative, E1=E2.

The layer 54 has a creep resistance indicator I that decreases radially away from the axis of rotation of the pneumatic tyre. The first layer 56 has a creep resistance indicator I1 higher than a creep resistance indicator I2 of the second layer 58. In this particular instance, each creep resistance indicator I, I1, I2 is a Mooney measurement value effected using a type L rotor at 60° C. A Mooney measurement has the units Mooney units for which a symbol is UM. Mooney measurements are effected using a viscosimeter in accordance with standard ASTM D 1646-99. Mooney measurements are carried out according to the following principle: the generally raw mixture is moulded in a cylindrical chamber heated to a given temperatures, usually 100° C. and in this instance 60° C. After one minute of preheating, the rotor is rotated in the test specimen at 2 revolutions per minute and the torque needed to sustain this motion after 4 minutes of rotation is measured.

For preference, the variation in the creep resistance indicator I is comprised between 3 and 25 UM and, more preferably still, between 5 and 20 UM.

It should be noted that the self-sealing products described have a very low level of cross linking after the pneumatic tyre has been vulcanized such that it is still possible to characterized these products in terms of their UM.

One method of building a green form of the pneumatic tyre 10A will now be described.

Use is made of a tyre-building drum which is substantially of revolution about an axis coincident with the axis of the green tyre which is also the axis of the future pneumatic tyre 10A. The drum comprises an external surface on which the various layers of products are laid.

The first layer 56 is laid on the laying surface of the tyre-building drum, then the second layer 58 is laid on the first layer. Next, the internal sealing layer 40 is laid in contact with the second layer 58. Finally, the subsequent layers and plies are laid in order to create a green tyre that will be used to obtain the pneumatic tyre 10A of FIG. 1.

Figure 2:
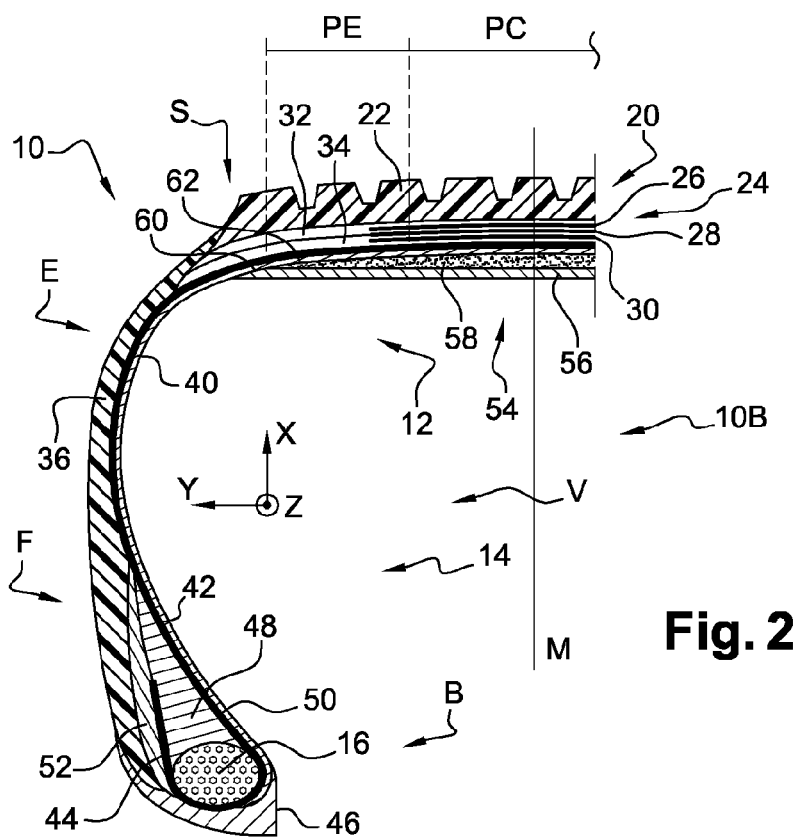
FIG. 2 illustrates a view in radial section of a pneumatic tyre according to a second embodiment of the invention.

FIG. 2 depicts a pneumatic tyre 10B according to a second embodiment of the invention. Elements similar to those depicted in the preceding figure are denoted via identical references.

In contrast with the first embodiment, the thickness E2 of the second layer 58 is axially variable. The second layer 58 comprises an axially central portion PC joining together two axial end portions PE delimited by the axial end edges 62. The thickness of each axial end portion PE is less than the thickness of the axially central portion PC. In this particular instance, the thickness E2 of the second layer 58 is at a minimum at each axial end edge 62. This embodiment has the advantage of minimizing the risks of the second layer 58 creeping in service.

Figure 3:
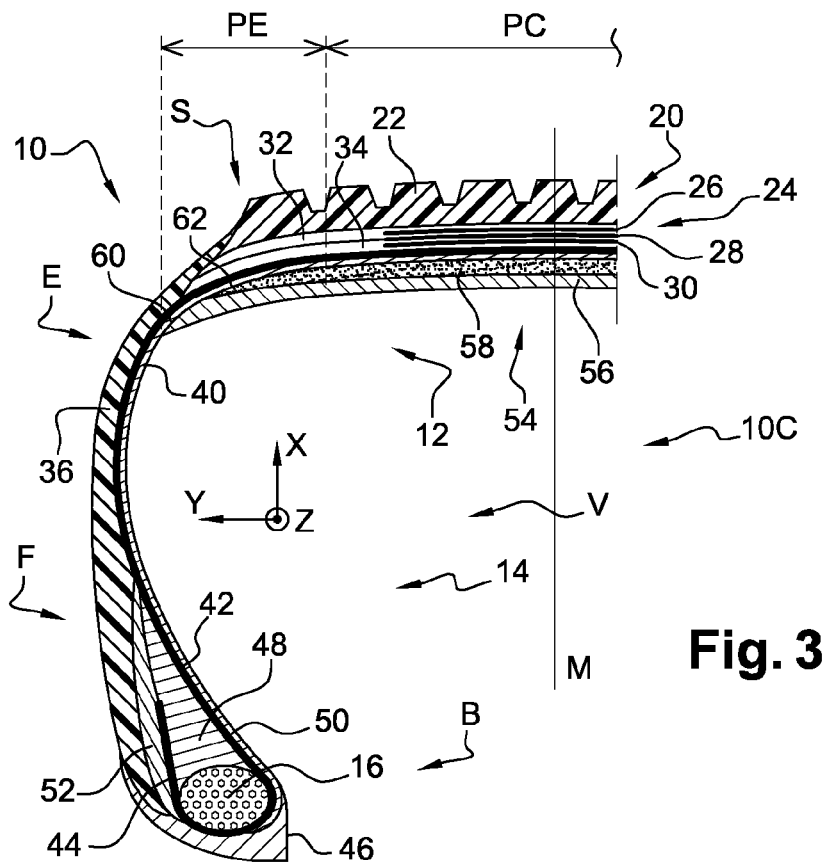
FIG. 3 illustrates a view in radial section of a pneumatic tyre according to a third embodiment of the invention.

FIG. 3 depicts a pneumatic tyre 100 according to a third embodiment of the invention. Elements similar to those depicted in the preceding figures are denoted via identical references.

By contrast with the first embodiment, the thickness E1 of the first layer 56 is axially variable. The first layer 56 comprises an axially central portion PC joining together two axial end portions PE delimited by the axial end edges 60. The thickness of each axial end portion PE is greater than the thickness of the axially central portion PC. In this particular instance, the thickness E1 of the first layer is at a maximum more of less facing each axial end edge 62 of the second layer 58. This embodiment makes it possible to ensure good resistance to air loss over the entire crown section of the pneumatic tyre.

Figure 4:
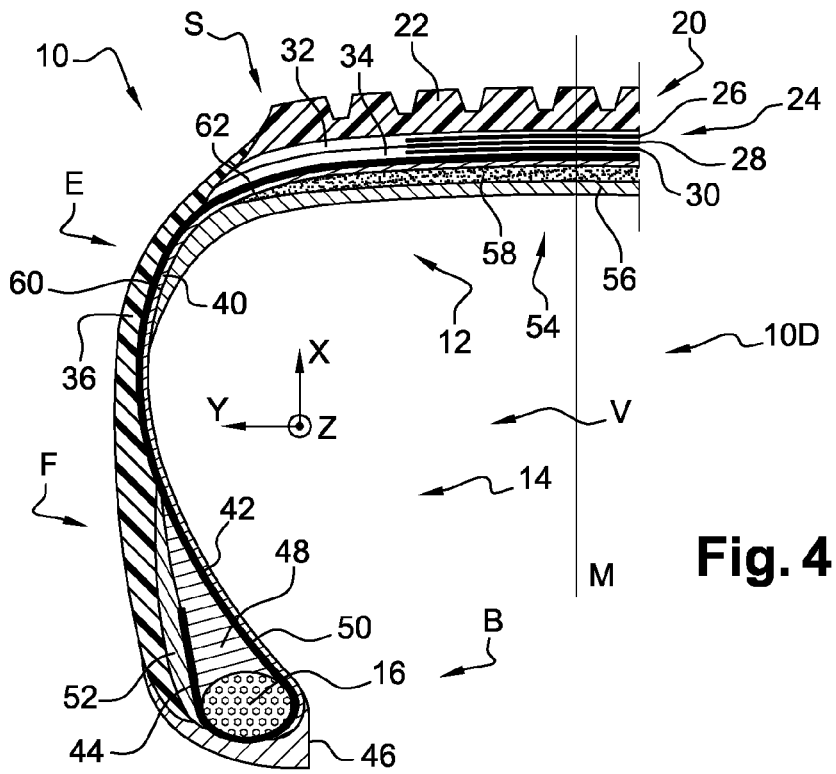
FIG. 4 illustrates a view in radial section of a pneumatic tyre according to a fourth embodiment of the invention.

FIG. 4 depicts a pneumatic tyre 10D according to a fourth embodiment of the invention. Elements similar to those depicted in the preceding figures are denoted via identical references.

By contrast with the third embodiment, the first layer 56 is in contact with the layer 40 along the shoulder E and a portion of the sidewall F. In other words, the width L1 of the first layer 56 of the pneumatic tyre 10D according to the fourth embodiment is greater than the width L1 of the first layer 56 of the pneumatic tyre 100 according to the third embodiment. This embodiment has the advantage of protecting the pneumatic tyre 10D against air loss from the shoulders E and the adjacent parts of the sidewalls F.

The invention is not restricted to the embodiments described hereinabove.

Specifically, the features of the various embodiments could be combined in any way where these features are mutually compatible.

In addition, the number of layers of distinct self-sealing products can be increased in order to make the variation in creep resistance of the self-sealing layer more progressive.

The invention claimed is:

1. A pneumatic tyre comprising:
an internal sealing layer structured to partially delimit an internal volume of the pneumatic tyre; and
a self-sealing layer formed of at least one self-sealing product, the self-sealing layer being positioned radially on an inside region with respect to the internal sealing layer, and the self-sealing layer having a creep resistance indicator that decreases radially towards outside of the pneumatic tyre,
wherein the self-sealing layer includes first and second layers respectively formed of first and second self-sealing products, each of which contains a diene elastomer, a hydrocarbon resin, a liquid plasticizer, and optionally a filler,
wherein the first layer is positioned radially on an inside region with respect to the second layer,
wherein the first self-sealing product has a creep resistance indicator greater than a creep resistance indicator of the second self-sealing product, and
wherein the first layer extends axially on an outside region beyond the second layer.

2. The pneumatic tyre according to claim 1, wherein each of the first and second self-sealing products includes:
the diene elastomer serving as a predominant elastomer,
between 20 and 90 parts by weight per hundred parts of solid elastomer of the hydrocarbon resin,
at most 60 parts by weight per hundred parts of solid elastomer of the liquid plasticizer, the liquid plasticizer having a glass transition temperature below −10° C., and
at most 60 parts by weight per hundred parts of solid elastomer of the filler.

3. The pneumatic tyre according to claim 2, wherein a content of the liquid plasticizer in the self-sealing layer is at a maximum in a radially outer portion of the self-sealing layer and at a minimum in a radially inner portion of the self-sealing layer, at least over an axial portion of the self-sealing layer that is centred axially about a median plane of the pneumatic tyre.

4. The pneumatic tyre according to claim 3, wherein a radial variation in the content of the liquid plasticizer in the self-sealing layer is greater than 5 parts per hundred parts of solid elastomer.

5. The pneumatic tyre according to claim 4, wherein a content of the filler in the self-sealing layer is at a minimum in a radially outer portion of the self-sealing layer and at a maximum in a radially inner portion of the self-sealing layer, at least over an axial portion of the self-sealing layer that is centred axially about a median plane of the pneumatic tyre.

6. The pneumatic tyre according to claim 4,
wherein each of the first and second self-sealing products includes a cross linking system, and
wherein a content of the cross linking system in the self-sealing layer is at a minimum in a radially outer portion of the self-sealing layer and at a maximum in the radially inner portion of the self-sealing layer, at least over an axial portion of the self-sealing layer that is centred axially about a median plane of the pneumatic tyre.

7. The pneumatic tyre according to claim 4, wherein the first self-sealing product includes:
between 20 and 70 parts by weight of the hydrocarbon resin per hundred parts of solid elastomer,
at most 20 parts by weight of the liquid plasticizer per hundred parts of solid elastomer, and
at most 60 parts by weight of the filler per hundred parts of solid elastomer.

8. The pneumatic tyre according to claim 4, wherein the second self-sealing product includes:
between 30 and 90 parts by weight of the hydrocarbon resin per hundred parts of solid elastomer,
at most 60 parts by weight of the liquid plasticizer per hundred parts of solid elastomer, and
at most 30 parts by weight of the filler per hundred parts of solid elastomer.

9. The pneumatic tyre according to claim 3, wherein a content of the filler in the self-sealing layer is at a minimum in a radially outer portion of the self-sealing layer and at a maximum in a radially inner portion of the self-sealing layer, at least over an axial portion of the self-sealing layer that is centred axially about a median plane of the pneumatic tyre.

10. The pneumatic tyre according to claim 3,
wherein each of the first and second self-sealing products includes a cross linking system, and
wherein a content of the cross linking system in the self-sealing layer is at a minimum in a radially outer portion of the self-sealing layer and at a maximum in the radially inner portion of the self-sealing layer, at least over an axial portion of the self-sealing layer that is centred axially about a median plane of the pneumatic tyre.

11. The pneumatic tyre according to claim 3, wherein the first self-sealing product includes:

between 20 and 70 parts by weight of the hydrocarbon resin per hundred parts of solid elastomer,
at most 20 parts by weight of the liquid plasticizer per hundred parts of solid elastomer, and
at most 60 parts by weight of the filler per hundred parts of solid elastomer.

12. The pneumatic tyre according to claim 3, wherein the second self-sealing product includes:
between 30 and 90 parts by weight of the hydrocarbon resin per hundred parts of solid elastomer,
at most 60 parts by weight of the liquid plasticizer per hundred parts of solid elastomer, and
at most 30 parts by weight of the filler per hundred parts of solid elastomer.

13. The pneumatic tyre according to claim 2, wherein a content of the filler in the self-sealing layer is at a minimum in a radially outer portion of the self-sealing layer and at a maximum in a radially inner portion of the self-sealing layer, at least over an axial portion of the self-sealing layer that is centred axially about a median plane of the pneumatic tyre.

14. The pneumatic tyre according to claim 2,
wherein each of the first and second self-sealing products includes a cross linking system, and
wherein a content of the cross linking system in the self-sealing layer is at a minimum in a radially outer portion of the self-sealing layer and at a maximum in the radially inner portion of the self-sealing layer, at least over an axial portion of the self-sealing layer that is centred axially about a median plane of the pneumatic tyre.

15. The pneumatic tyre according to claim 2, wherein the first self-sealing product includes:
between 20 and 70 parts by weight of the hydrocarbon resin per hundred parts of solid elastomer,
at most 20 parts by weight of the liquid plasticizer per hundred parts of solid elastomer, and
at most 60 parts by weight of the filler per hundred parts of solid elastomer.

16. The pneumatic tyre according to claim 2, wherein the second self-sealing product includes:
between 30 and 90 parts by weight of the hydrocarbon resin per hundred parts of solid elastomer,
at most 60 parts by weight of the liquid plasticizer per hundred parts of solid elastomer, and
at most 30 parts by weight of the filler per hundred parts of solid elastomer.

17. The pneumatic tyre according to claim 1,
wherein each of the first and second self-sealing products includes a cross linking system, and
wherein a content of the cross linking system in the self-sealing layer is at a minimum in a radially outer portion of the self-sealing layer and at a maximum in the radially inner portion of the self-sealing layer, at least over an axial portion of the self-sealing layer that is centred axially about a median plane of the pneumatic tyre.

18. The pneumatic tyre according to claim 1, wherein the first self-sealing product includes:
between 20 and 70 parts by weight of the hydrocarbon resin per hundred parts of solid elastomer,
at most 20 parts by weight of the liquid plasticizer per hundred parts of solid elastomer, and
at most 60 parts by weight of the filler per hundred parts of solid elastomer.

19. The pneumatic tyre according to claim 1, wherein the second self-sealing product includes:
between 30 and 90 parts by weight of the hydrocarbon resin per hundred parts of solid elastomer,
at most 60 parts by weight of the liquid plasticizer per hundred parts of solid elastomer, and
at most 30 parts by weight of the filler material per hundred parts of solid elastomer.

20. The pneumatic tyre according to claim 1, wherein a thickness of the first layer is less than or equal to a thickness of the second layer over an axially central portion of the pneumatic tyre.

21. The pneumatic tyre according to claim 1,
wherein the creep resistance indicator is a Mooney viscosity measurement effected using an L-type rotor at 60° C., and
wherein an amplitude by which the creep resistance indicator in the self-sealing layer varies is between 3 and 25 Mooney units (UM).

22. The pneumatic tyre according to claim 21, wherein the amplitude by which the creep resistance indicator in the self-sealing layer varies is between 5 and 20 Mooney units (UM).

23. A pneumatic tyre comprising:
an internal sealing layer structured to partially delimit an internal volume of the pneumatic tyre; and
a self-sealing layer formed of at least one self-sealing product, the self-sealing layer being positioned radially on an inside region with respect to the internal sealing layer, and the self-sealing layer having a creep resistance indicator that decreases radially towards outside of the pneumatic tyre,
wherein the self-sealing layer includes first and second layers respectively formed of first and second self-sealing products,
wherein the first layer is positioned radially on an inside region with respect to the second layer,
wherein the first self-sealing product has a creep resistance indicator greater than a creep resistance indicator of the second self-sealing product, and
wherein a thickness of the first layer is axially variable, such that a thickness of an axial end portion of the first layer is greater than a thickness of an axially central portion of the first layer.

24. The pneumatic tyre according to claim 23, wherein each of the at least one self-sealing product includes:
a diene elastomer serving as a predominant elastomer,
between 20 and 90 parts by weight per hundred parts of solid elastomer of a hydrocarbon resin,
at most 60 parts by weight per hundred parts of solid elastomer of a liquid plasticizer, the liquid plasticizer having a glass transition temperature below −10° C., and
at most 60 parts by weight per hundred parts of solid elastomer of a filler.

25. The pneumatic tyre according to claim 24, wherein a content of the liquid plasticizer in the self-sealing layer is at a maximum in a radially outer portion of the self-sealing layer and at a minimum in a radially inner portion of the self-sealing layer, at least over an axial portion of the self-sealing layer that is centred axially about a median plane of the pneumatic tyre.

26. The pneumatic tyre according to claim 25, wherein a radial variation in the content of the liquid plasticizer in the self-sealing layer is greater than 5 parts per hundred parts of solid elastomer.

27. The pneumatic tyre according to claim 23, wherein a thickness of the first layer is less than or equal to a thickness of the second layer over an axially central portion of the pneumatic tyre.

28. The pneumatic tyre according to claim 23,
wherein the creep resistance indicator is a Mooney viscosity measurement effected using an L-type rotor at 60° C., and
wherein an amplitude by which the creep resistance indicator in the self-sealing layer varies is between 3 and 25 Mooney units (UM).

29. The pneumatic tyre according to claim 28, wherein the amplitude by which the creep resistance indicator in the self-sealing layer varies is between 5 and 20 Mooney units (UM).

30. A pneumatic tyre comprising:
an internal sealing layer structured to partially delimit an internal volume of the pneumatic tyre; and
a self-sealing layer formed of at least one self-sealing product, the self-sealing layer being positioned radially on an inside region with respect to the internal sealing layer, and the self-sealing layer having a creep resistance indicator that decreases radially towards outside of the pneumatic tyre,
wherein the self-sealing layer includes first and second layers respectively formed of first and second self-sealing products, each of which contains a diene elastomer, a hydrocarbon resin, a liquid plasticizer, and optionally a filler,
wherein the first layer is positioned radially on an inside region with respect to the second layer,
wherein the first self-sealing product has a creep resistance indicator greater than a creep resistance indicator of the second self-sealing product, and
wherein a thickness of the second layer is axially variable, such that a thickness of an axial end portion of the second layer is less than a thickness of an axially central portion of the second layer.

31. The pneumatic tyre according to claim 30, wherein each of the at least one self-sealing product includes:
the diene elastomer serving as a predominant elastomer,
between 20 and 90 parts by weight per hundred parts of solid elastomer of the hydrocarbon resin,
at most 60 parts by weight per hundred parts of solid elastomer of the liquid plasticizer, the liquid plasticizer having a glass transition temperature below −10° C., and
at most 60 parts by weight per hundred parts of solid elastomer of the filler.

32. The pneumatic tyre according to claim 31, wherein a content of the liquid plasticizer in the self-sealing layer is at a maximum in a radially outer portion of the self-sealing layer and at a minimum in a radially inner portion of the self-sealing layer, at least over an axial portion of the self-sealing layer that is centred axially about a median plane of the pneumatic tyre.

33. The pneumatic tyre according to claim 32, wherein a radial variation in the content of the liquid plasticizer in the self-sealing layer is greater than 5 parts per hundred parts of solid elastomer.

34. The pneumatic tyre according to claim 30, wherein a thickness of the first layer is less than or equal to a thickness of the second layer over an axially central portion of the pneumatic tyre.

35. The pneumatic tyre according to claim 30,
wherein the creep resistance indicator is a Mooney viscosity measurement effected using an L-type rotor at 60° C., and
wherein an amplitude by which the creep resistance indicator in the self-sealing layer varies is between 3 and 25 Mooney units (UM).

36. The pneumatic tyre according to claim 35, wherein the amplitude by which the creep resistance indicator in the self-sealing layer varies is between 5 and 20 Mooney units (UM).

* * * * *